United States Patent [19]

Lin

[11] Patent Number: 5,580,915
[45] Date of Patent: Dec. 3, 1996

[54] SILICONE ADHESIVE COMPOSITIONS WITH IMPROVED QUICK STICK

[75] Inventor: Shaow B. Lin, Schenectady, N.Y.

[73] Assignee: General Electric Company, Waterford, N.Y.

[21] Appl. No.: 511,318

[22] Filed: Aug. 4, 1995

Related U.S. Application Data

[63] Continuation of Ser. No. 298,539, Aug. 30, 1994, abandoned, which is a continuation of Ser. No. 61,655, May 13, 1993, abandoned.

[51] Int. Cl.$^6$ .................................................... C08K 5/54
[52] U.S. Cl. ......................... 524/267; 524/264; 524/484; 528/24; 525/477; 525/478
[58] Field of Search .............................. 525/477, 478; 528/24; 524/264, 267, 484

[56] References Cited

U.S. PATENT DOCUMENTS

| | | |
|---|---|---|
| 3,929,704 | 12/1975 | Horning . |
| 3,965,136 | 6/1976 | Knollmueller . |
| 3,992,429 | 11/1976 | Knollmueller . |
| 4,058,546 | 11/1977 | Knollmueller . |
| 4,077,993 | 3/1978 | Knollmueller . |
| 4,309,520 | 1/1982 | Blizzard . |
| 4,485,206 | 11/1984 | Inoue et al. ............................ 525/477 |
| 4,584,355 | 4/1986 | Blizzard et al. . |
| 4,585,836 | 4/1986 | Homan et al. ........................... 525/477 |
| 4,882,377 | 11/1989 | Sweet et al. . |
| 5,096,981 | 3/1992 | Traver . |
| 5,128,394 | 7/1992 | Traver et al. . |
| 5,175,058 | 12/1992 | Traver . |
| 5,190,827 | 3/1993 | Lin . |

FOREIGN PATENT DOCUMENTS

| | | |
|---|---|---|
| 8600532A | 1/1986 | European Pat. Off. . |
| 253601 | 1/1988 | European Pat. Off. . |
| 0253601A | 1/1988 | European Pat. Off. . |
| 393426 | 10/1990 | European Pat. Off. . |
| 459292 | 12/1991 | European Pat. Off. . |
| 0506370A | 9/1992 | European Pat. Off. . |
| 506370 | 9/1992 | European Pat. Off. . |
| 0553983A | 8/1993 | European Pat. Off. . |
| 553983 | 8/1993 | European Pat. Off. . |
| 0581539A | 2/1994 | European Pat. Off. . |
| 02090845 | 7/1982 | United Kingdom . |

*Primary Examiner*—Melvyn I. Marquis
*Attorney, Agent, or Firm*—Kenneth S. Wheelock

[57] ABSTRACT

Silicone adhesive compositions having excellent quick stick, peel and tack adhesion properties are provided. Generally the adhesive composition is the reaction mixture of a silanol-containing siloxane resin, a silicone polymer gum, and a silicone fluid containing functionality capable of reacting with silanol and silanol-like groups; optionally, a solvent; and a cure catalyst are added.

15 Claims, No Drawings

SILICONE ADHESIVE COMPOSITIONS WITH IMPROVED QUICK STICK

This is a continuation of Ser. No. 08/298,539 filed on Aug. 30, 1994, now abandoned, which is a continuation of Ser. No. 08/061/655 filed on May 13, 1993, also now abandoned.

CROSS REFERENCE

Reference is made to concurrently filed application Ser. No. 08/061,794 filed May 13, 1993, abandoned.

BACKGROUND OF THE INVENTION

The present invention relates to pressure-sensitive adhesive compositions. More particularly the present invention relates to pressure-sensitive adhesives formed from silicone adhesive compositions having excellent tack and adhesive properties.

The term silicone "pressure sensitive adhesive" (PSA) refers to silicone adhesives that adhere to a surface and then are stripped from the surface without transferring more than trace quantities of adhesive to the surface, and can be readhered to the same or another surface because the adhesive retains some or all of its tack and adhesive strength. It is recognized that some surfaces in particular applications form a strong bond with the silicone PSA. In these instance, substrate failure can occur when the PSA is stripped. Generally, however, silicone PSA's exhibit clean removeability.

Silicone PSA's have excellent adhesive and cohesive strength and high tack as well as excellent weatherability, temperature stability, excellent electrical properties and chemical resistance. One use for silicone PSA's are splicing tapes for substrates such as Teflon® and siliconized surfaces. In coating operations, splicing time is limited, particularly when line speeds are high, so the ability of a silicone PSA to wet out on a surface and then aggressively adhere to it is important. This "on-the-fly" splicing ability of silicone PSA is difficult to measure. Industry-wide tests such as peel adhesion to steel or probe tack adhesion are inadequate for measuring the silicone PSA's performance in application such as splicing. Hence, the loop tack test is selected to demonstrate the ability of a silicone PSA to splice on a selected substrate.

The term "quick stick" refers to a silicon PSA's peel, tack, and loop tack performance. It is desirable to produce a pressure-sensitive adhesive composition exhibiting the ability to adhere to various substrates after a short period of contact.

U.S. Pat. No. 4,309,520, to Blizzard relates to a silicone pressure-sensitive adhesive composition comprising 45–75 parts by weight of a silicone resin and 25–55 parts by weight of a silicone polymer gum, the improvement comprising adding to said composition 0.5 to 50 parts by weight of a cluster compound which contains saterically hindered alkyl groups, based on a total of 100 parts by weight of the resin and polymer gums. These cluster compounds are known in the art.

U.S. Pat. No. 3,992,429, to Knollmueller discloses alkoxysilicone multiple cluster compounds and their preparation.

U.S. Pat. No. 4,077,993, to Knollmueller discloses an improved method for preparing alkoxysilicone multiple cluster compounds.

U.S. Pat. No. 4,058,546 to Knollmueller discloses alkoxysilane double cluster compounds with silicone bridges and their preparation and use.

U.S. Pat. No. 5,190,827, to Lin relates to silicone pressure-sensitive adhesive compositions having high solids contents comprised of a MQ resin, an alkenyl-silicone fluid, and a hydride-silicone fluid. These compositions are cured by a platinum catalyst.

U.S. Pat. Nos. 5,175,058 and 5,096,981 to Traver relate to pressure-sensitive adhesives made from polydioganosiloxanes gum, and requiring the use of primers.

U.S. Pat. No. 3,929,704 to Horning relates to silicone pressure-sensitive adhesive and comprising a silicone resin, a silicone gum and a catalytic amount of a curing agent, said curing agent comprising from about 10 to about 90% by weight of 2,4-dichlorobenzoyl peroxides, a plasticizer and an extender.

U.S. Pat. No. 4,882,377 to Sweet et al, relates to low viscosity pressure-adherent silicone elastomer compositions comprising a mixture of a silicone pressure sensitive composition, a crosslinkable silicone elastomer composition which cure by a chemistry inert to said silicone PSA and a viscosity reducing agent. According to the claim the mixture gives an adhesive with reduced aggressiveness of the adhesive.

All of the above mentioned compositions fail to exhibit the unique combination of quick stick property and peel and tack adhesion as found in the present invention.

It is desirable to provide silicone compositions which upon curing form a pressure sensitive adhesive with the capability to develop rapid and strong adhesion properties to the substrates.

It is further desirable to provide silicone compositions which upon curing form pressure sensitive adhesive tapes with improved loop tack adhesion property while the peel and probe tack adhesions are acceptable. One particular use for the PSA tapes is as splicing tapes.

One aspect of the present invention is the production of silicone PSA's exhibiting a combination of high peel, tack, and excellent loop tack performance.

SUMMARY

The present invention is directed to a composition suitable for forming pressure sensitive adhesive which is the reaction mixture of the following components:

(A) about 45 to about 75 parts by weight of a silanol-containing, benzene-soluble siloxane resin comprising primarily of $R_3SiO$— and $SiO_{4/2}$ units, (B) about 25 to about 50 parts by weight of a high molecular weight silicone gum, the total of components (A) and (B) being 100 parts by weight, and (C) about 2 to about 30 parts by weight of a silicone fluid containing functionalities reactive with silanol or silanol-like groups; and optionally (D) an organic solvent; and optionally (E) a cure catalyst.

The pressure sensitive adhesives formed, with and without the assist of the cure catalyst, from the composition exhibit exceptionally quick stick capability (i.e. rapid and strong adhesion) as measured by loop tack adhesion as well as good peel and tack adhesion properties. The incorporation of said silanol-reactive silicone fluid results in the synergistic improvement.

DETAILED DESCRIPTION OF THE INVENTION

The present invention discloses a silicone composition comprising the reaction product of a silanol-containing siloxane resin, a silicone polymer gum, and a silicone fluid reactive with silanol or silanol-like functionalities. The composition forms a pressure-sensitive adhesive (PSA) with rapid adhering and strong stick capability as well as good peel and tack adhesion properties. The synergistic adhesion performance results from having the reactive silicone fluid incorporated in the composition.

Siloxane resins are known in the art. These resins are generally referred to as MQ resins and soluble in aromatic solvents, and contain M units, represented by the formula $R_3SiO_{1/2}$ and Q units, represented by the formula $SiO_{4/2}$. It is recognized that while the MQ resins are primarily made from M and Q units, there can be up to 5 mole percent of D units represented by the formula $R_2SiO_{2/2}$ and T units, represent by the formula $R_3SiO_{1/2}$. R is a monovalent hydrocarbon radical. Examples of radicals represented by R include those radicals having from about 1 to about 6 carbon atoms, such as alkyl radicals including methyl, ethyl, and isopropyl; alkenyl radicals including ethylene, propenyl, and hexenyl; cycloaliphatic radicals such as cyclopentyl cyclohexenyl; olefinic-containing radicals such as vinyl and allyl; and olefinic-containing radicals. R is preferably methyl. The MQ resin is preferably a silanol-containing MQ resin having an M to Q ratio from about 0.6:1 to about 0.9:1. The silicon bonded hydroxy group or the silanol content in the MQ resin is generally from about 0.2% to about 5%, preferably from about 1% to about 3%, and most preferably from about 1.5% to about 2.5% by weight of the total weight of the MQ resin.

The amount of MQ resin present in the composition of this invention is from about 45 to about 75 weight percent, preferably from about 50 weight percent to about 70 weight percent, and still more preferably from about 50 weight percent to about 65 weight percent of the total silicone weight.

Methods for making the silicone resin are known in the art. U.S. Pat. No. 2,676,182 to Daudt et al. discloses a method in which a silica hydrosol is reacted under acidic conditions with a source of triorganosiloxy units such as hexaorganodisiloxane, e.g., hexamethyldisiloxane, or hydrolyzable triorganosiloxane, e.g. trimethylchlorosiloxane or mixtures thereof, and recovering a benzene soluble resin copolymer having M and Q units.

The MQ resin is commercially available in solution form in a solvent such as xylene or toluene, generally at a 40% to 60% by weight solution. The MQ resin is physically mixed with a silicone gum and a silicone fluid in organic solvent to form a homogeneous mixture.

The silicone polymer gum of the present invention is generally referred to as a high molecular weight gum. The term "gum" refers to a high viscosity material having a viscosity from about 800,000 centipoise (cps) to about 200,000,000 centipoise at 25° C., using a viscosity meter such as a Rheometrics rheometer.

The silicone gum of the present invention is well-known to the art and is one or more polydioganosiloxanes. The silicone gum can generally be represented by the following formula:

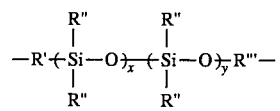

wherein each R" can be independently selected from the group consisting of alkyl, alkenyl, phenyl, aryl and arylalkyl. R''' is R", R' is either a hydroxy group or R". R" is preferably methyl, ethyl, vinyl or phenyl, with at least 95 percent of all R" radicals being methyl. The sum of x+y must be high enough so that the silicone gum has a viscosity from about 800,000 cps to about 200,000,000 cps at 25° C. More particularly the sum x+y value is sufficient high to give a viscosity from about 1,000,000 cps to about 200,000,000 cps. Most preferably, the silicone gum of the present invention is a silanol-stopped polydimethylsiloxane.

The polydimethylsiloxane can be prepared by any of the methods known in the art. For example, the polydiorganosiloxanes can be prepared according to the method disclosed in U.S. Pat. No. 2,814,601, herein incorporated by reference, wherein an appropriate siloxane is reacted with an aqueous acid in a closed system until the viscosity of the siloxane has become essentially constant. The product is then washed free of acid.

The silicone fluid of the present invention is compatible with said siloxane resin and said silicone polymer gum. The term "compatible" means the silicone fluid will exist in a fairly uniform, dispersed state in the composition of this invention while participating in the reaction and curing, if applied, until cure has been effected.

The silicone fluid can be characterized in that it is flowable at 25° C. The viscosity of the silicone fluid is about 500M cps or lower, and preferably it is 100M cps or less, at 25° C.

Silicone fluids for use in the current invention typically contain units which can be represented by the following formula:
(1) $R^1 R^2Si(OSiR^2_2)_m(OSiR^3R^4)_nOSiR^1_2R^2$ or
(2) copolymers comprising $R^1R^2_2SiO_{1/2}$, $R^2_2SiO_{2/2}$, $R^3R^4SiO_{2/2}$, or $R^1SiO_{3/2}$ units,
wherein each $R^2$ is independently an alkyl, aryl, or arylalkyl group having up to 10 carbon atoms; and wherein $R^1$, $R^3$ and $R^4$ each having up to 10 carbon atoms are independently selected from alkyl, aryl, arylalkyl, alkenyl, hydroxy, hydroxyalkyl, alkoxy, allyl, hydrogen, epoxide-containing aliphatic, cycloaliphatic or aromatic, amine, aminocarboxy, and fully- or partially fluorinated alkyl, alkenyl, or aryl. At least there contains one silanol reactive functionality in each molecule. The term "silanol reactive" means a part of the silicone fluid is capable of reactive with a silanol group with or without the aid of a reaction catalyst. Examples of "silanol reactive" group includes the following groups and derivatives from them: hydroxy, hydroxyalkyl, hydrogen, epoxide-containing aliphatic, cycloaliphatic or aromatic, alkoxy, amine, aminocarboxy, and the sum of n+m is such that the viscosity of the fluid is up to about 500,000 centipoise at 25° C.

Preferred silicone fluid of the present invention is a polydiorganosiloxane containing at least one functionality selected from the following: hydroxy, alkoxy, hydroxyalkyl, epoxide and amine with the viscosity up to 100,000 cps at 25° C.

The most preferred silicone fluid of the present invention is a silanol-containing silicone fluid with a viscosity up to 100,000 cps at 25° C.

Silicone fluids for use in the present invention can be prepared according to methods known to the art. Exemplary types of silicone fluids can include alkenyl-terminated polydiorganosiloxanes, organohydrogen polysiloxanes or silanol containing fluids.

Alkenyl-terminated polydiorganosiloxanes can be prepared by any of the conventional methods for preparing triogano terminated polydiorganosiloxanes. For example, a proper ratio of the appropriate hydrolyzable silanes, e.g., vinyldimethylchlorosilane and dimethyldichlorosilane, may be co-hydrolyzed and condensed or alternately an appropriate 1,3-divinyltetraorganodisiloxane, e.g., symmetrical divinyldimethyldiphenylsiloxane or divinyltetramethylsiloxane, which furnished the end groups of the polydiorganosiloxane, may be equilibrated with an appropriate diorganopolysiloxane, e.g. methylcyclotetrasiloxane, in the presence of an acidic or basic catalyst. Regardless of the method of preparation of polydiorganosiloxane, there is usually coproduced a varying quantity of volatile, cyclic polydiorganosiloxanes. It is desirable to remove volatile cyclic polydiorganosiloxanes, e.g. methyl tetramer, since they are volatile and can adversely affect pressure sensitive adhesive properties.

Another type of silicone fluid includes organohydrogen polysiloxanes. Organohydrogenpolysiloxanes can be prepared by any method known to the art. The preparation of organohydrogensiloxanes can be accomplished in any suitable manner such as by hydrolyzing silanes, such as chlorosilanes, and equilibrating the resulting hydrolyzate under acid catalysis. Alternatively, a mixture of suitable siloxanes, such as cyclic siloxanes and linear siloxanes, can be copolymerized and equilibrated under acid catalysis. For example, a hydride-stopped silicone fluid suitable for use in the present invention can be prepared by reacting tetramethyldisiloxane and cyclic methyl tetramer of predetermined ratio in the presence of a catalyst for 4–6 hours at 80°–100° C. The catalyst is then removed by filtration and the residual reactants are removed by vacuum stripping.

Another type of silicone fluid includes silanol. Silanol-containing silicone fluid can be prepared by the methods well know to the skilled artisan. For example, a silanol-containing silicone fluid comprising M, D, and T units can be made by co-hydrolyzing an appropriate blend of methyl mono-, di-, and tri-chlorosilanes by a continuous hydrolysis process in an aqueous HCl solution. The silanol-level can be controlled by the HCl concentration in the mixture during hydrolysis. The oil phase is then separated from the resulting two-phase mixture product and further washed free of acid with a base such as sodium carbonate and sodium chloride. The residual water in the silicone fluid can be further removed with a Fuller's Earth or a filter aid such as Celite.

Silicone compositions of the invention are the reaction mixture comprising the following components:

(A) about 45 to about 75 percent of a solid, benzene-soluble, silanol-containing siloxane resin copolymer consisting primarily of $R^5_3SiO_{1/2}$ and $SiO_{4/2}$ units and up to 5 molar percent of $R^5_2SiO_{2/2}$ and $R^5SiO_{3/2}$ units. Wherein each $R^5$ individually is a hydrocarbon radical containing no more than six carbon atoms, there being from 0.6 to 0.9 inclusive $R^5_3SiO_{1/2}$ units for every $SiO_{4/2}$ units, the resin comprises from about 0.2% to about 5.0% by weight, based on the total solids resin weight, of hydroxy radicals, and (B) about 25 to about 55 percent of a silicone polymer having a viscosity from about 800,000 centipoise (cps) to about 200,000,000 cps at 25° C. The total solids weight of (A) and (B) being 100 parts, and (C) about 2 to about 30 parts by weight, based on the total solids weight of (A) and (B) being 100 parts; of a silicone fluid which is compatible with (A) and (B), and capable of reacting with silanol functionality, and optionally (D) an organic solvent. The preferred silicone composition of the invention is a condensed solution mixture of a silanol-containing silicone fluid, a silanol-containing diorganosiloxane polymer gum with a silanol-containing siloxane resin with a M to Q ratio ranging from 0.6:1 through 0.9: 1. One skilled in the art would recognize that many possible mechanisms are at play in the adhesive compositions of the present invention. Without being limited to any one theory, it is believed that the silanol functionality plays a strong role in the formation of a covalently bonded structure, through silanol condensation, of resin, fluid and polymer gum.

Other preferred silanol-reactive functionalties such as alkoxy including methoxy, ethoxy, propoxy, amine, aminocarboxy, carboxy can form similar structures via acid-base catalysis methods. It will become obvious to those skilled in the art that other classes of functionalties such as hydride, epoxide-containing silicone fluids can react with silanol groups, via known catalyst as platinum, tin compounds, and form covalently bonded structure with resin or gum, and give useful adhesive properties described in this invention.

The compositions of the present invention can optionally further comprise from about 20% to about 70% by weight, preferably from about 30% to about 60% by weight, and most preferably from 40% to about 50% by weight of an organic solvent. Suitable organic solvents include any of the solvents conventionally used with organsiloxanes and have a boiling point below approximately 250° C., such as aromatic hydrocarbons, e.g., benzene, toluene and xylene; aliphatic hydrocarbons such as hexane, heptane, and cyclohexane; halogenated hydrocarbon solvents such as trichloroethane and chloroform; naphthas such as petroleum ether, and oxygenated solvents such as hydocarbon ethers, e.g., tetrahydrofuran and the dimethylether of ethylene glycol; ketone such methyl, isobutyl ketone and esters such as ethyl acetate and the like. Mixtures of organic solvents can also be used.

The components of the compositions of this invention can be mixed in any manner such as in bulk or in organic solvent. The MQ resin is a solid and is conveniently prepared and handled in an organic solvent, the preparation of the composition of this invention preferably uses an organic solvent for the mixing of the MQ resin and siloxane gum. The mixing of the components can be accomplished by any of the techniques known in the art, such as milling, blending, stirring, and the like, either in batch or in continuous process.

A composition of this invention can be prepared, with or without the aid of solvent, by simply mixing the MQ resin, silicone gum, and catalyst together in the stated proportion. The order of mixing of the components is not critical.

Small amounts of additional ingredients may be added to the composition of this invention if desired. For example, antioxidants, pigments, stabilizers, fillers, and the like, may be added as long as they do not materially reduce the pressure-sensitive adhesive properties of these compositions.

The adhesive composition of the present invention can be prepared by heating to reflux e.g., at a temperature of 130° C., and cooking for about two to three hours a mixture of the resin, silicone polymer gums silicone fluid and an organic solvent in the presence of a base catalyst. The water formed during the condensation reaction is then removed. The resulting mixture is cooled, its solids content is adjusted, and the mixture is neutralized with acid.

Suitable base catalysts for preparing the silicone adhesives include, for example, alkali metal hydroxides, e.g., sodium hydroxide, potassium hydroxide and the like; an aminofunctional silanes such as those disclosed in U.S. Pat. No. 4,906,695 to Blizzard et al., which is hereby incorporated by reference. Suitable aminofunctional silanes include, for example, N-gamma-aminopropyltriethoxysilane, N-beta-aminoethyl-gamma-amino-isobutyltrimethoxysilane, and N-beta-aminoethyl-gamma-aminopropyltrimethoxysilane.

The preferred catalyst is sodium hydroxide, preferably in the form of an aqueous solution. The amount of base catalyst should be in the range of about 10 to about 40 ppm, preferably about 20 ppm, based on the combined weight of the resin and polymer.

Suitable acids for neutralizing the condensed mixture include mineral acids, such as hydrochloric acid, phosphoric acid, and the like and organic acids such as acetic acid, acetyl chloride, and the like.

Optionally, the composition of this invention can further comprise a rare earth metal salt of a fatty acid. This component acts to improve the high temperature adhesive performance of the pressure-sensitive adhesive of this invention.

Examples of rare earth metals suitable for forming the salt include cerium, lanthanum, praseodymium, and the like. The preferred rare earth metal cerium.

The fatty acid preferably contains about 6 to about 18 carbon atoms, most preferably about 8 carbon atoms. Thus, the preferred rare earth metal salt for use in the present invention is cerium octoate.

Generally, rare earth metal salt can be used in the composition of this invention in an amount sufficient to provide the composition with an amount of rare earth metal within the range of from about 10 to about 500 parts per million, based on the combined weight of solid resin and silicone gum. The benefit of having rare earth metal in the adhesive composition is disclosed in the patent application Ser. No. 07/895,297 filed Jun. 8, 1992, abandoned.

Typically, the rare earth metal salt is used in the composition of this invention in the form of a 30% solution, 6% of which is composed of the active rare earth metal. Examples of suitable solvents for the rare earth metal solution include, for example, hexane, heptane, toluene, xylene, mineral spirits and ketones.

The rare earth metal salt is added to the silicone adhesive mixture and solvent slowly in increments with agitation to get proper dispersion. Because rare earth metal salt is a base scavenger, it is necessary that the mixture be neutral or slightly acid before the rare earth metal salt is added.

The cure catalyst is generally a compound which, upon thermal or radiation exposure, generate radicals which cause cure or crosslinking reactions within the silicone composition. Examples of suitable cure catalyst include peroxides and azo compounds. Specific peroxides include acetyl and benzoyl peroxide, cumyl peroxide, 2,4-dichlorobenzoyl peroxide and the like. The amount of cure catalyst is generally an amount effective to cause the cure or crosslinking of silicone adhesive and is typically about 0.5 to about 3.0% by weight of silicone composition solids.

The adhesive composition is applied to the surface of a suitable substrate in any convenient manner such as by roll coating, by knife-over-roll coating, gravure coating and the like, by dipping the base member in solution, or by brushing or spraying solution on the surface.

The amount of adhesive material applied to the substrate can be varied to conform to the circumstances. Generally sufficient adhesive is applied to render the surface tacky to the touch after removing the solvent. After applying it to the substrate, the adhesive may be cured by air drying or by heating at temperatures ranging up to 300° C. Heating will hasten removal of the solvent and also tends to increase the cohesive strength of the adhesive film.

The compositions of this invention are useful as pressure sensitive adhesives and will readily stick to a solid support, whether flexible or rigid.

The surface of the support and the substrate to which the support is adhered may be any known solid material such as metals, such as aluminum, silver, copper, iron and their alloys; porous materials such as paper, wood, leather, and fabrics; Kapton® (Registered TradeMark), organic polymeric materials such as polyolefins, such as polyethylene and polypropylene, fluorocarbon polymers such as polytetrafluoroethylene and polyvinylfluoride, silicone elastomers, silicone resins, polystyrene, polyamides such as nylon, polyesters and acrylic polymers; painted surfaces; siliceous material such as concrete, bricks, cinderblocks, and glass such as glass cloth; etc. Porous materials such as glass cloth are often impregnated with a substance that will prevent the migration of the PSA from one surface to another surface of the support. It is also well known to chemically treat the surface of fluorocarbon polymer support to enhance the adhesion of a PSA to said surface.

Examples of articles made with the PSA composition of the present invention include pressure-sensitive adhesive tapes, labels, emblems and other decorative materials. One specific example includes splicing tapes which must withstand high temperature and very fast lines speeds resulting in high stress to the tapes.

A preferred article is a pressure-sensitive adhesive tape comprising a substrate selected from an impregnated glass cloth, a polyester polymer, or a chemically treated fluorocarbon polymer support carrying on at least one surface thereof the cured compositions of this invention.

"Legging" phenomena may occur wherein some adhesive coating delaminates and transfers to the backside of the tape. During slitting operations, a "webbing" phenomena can occur, wherein the adhesive coating resists slitting, resulting in unwanted adhesive delamination along the slit edge. Both legging and webbing can be eliminated if the adhesive layer is sufficiently primer-bonded to the surface of the tape substrate. A primer which can be used in this invention is SS4191 primer, available from General Electric Company. The SS4191 primer is a toluene solution of a curable dimethyl polysiloxane having a viscosity of 10,000–18,000 centipoise at 25° C. The solids content of the primer is about 29–31%. The SS4191 primer is normally used at a bath concentration of 3–10% solids. The SS4191 primer is used in combination with a catalyst, i.e., SS4192c catalyst, available from General Electric Company, and an accelerator, i.e., SS4259c accelerator, also available from General Electric Company. The SS4192c catalyst is a 50% xylene solution of dibutyltin diacetate. The SS4259c accelerator is a toluene solution of methyl-2-dime-tylaminoethoxy polysiloxane chain-stopped with trimthylsiloxy groups.

The following primer formulation and coating has been found to provide excellent anchorage of the PSA to a substrate:

| | |
|---|---|
| SS4191 primer | 10 parts by weight |
| SS4192c catalyst | 0.5 parts by weight |
| SS4259c accelerator | 0.5 parts by weight |
| Toluene | 72 parts by weight |
| Hexane | 18 parts by weight |

The SS4191 primer is diluted with the toluene and hexane prior to the addition of the catalyst and accelerator. The ingredients are mixed thoroughly. The primer composition is applied to the substrate and cured for 30 seconds at 125° C.

The primer can be applied to the substrate by conventional methods well-known in the art, e.g., spraying, roll coating, dip coating, brushing, and other art-recognized techniques.

The present invention is further directed to pressure sensitive adhesive formed from the cure of the composition of this invention. In addition, the present invention is directed to articles of manufacture containing a solid support having deposited on at least one surface thereof the pressure sensitive adhesive of this invention. The preferred article of manufacture within the scope of this invention is a pressure sensitive tape containing a flexible material having deposited on at least one surface thereof the pressure sensitive adhesive of this invention.

It is understood that other modifications will be apparent to and can be readily made by those skilled in the art without departing from the scope and spirit of the present invention. Accordingly, it is not intended that the scope of the claims appended hereto be limited to the descriptions set forth above but rather that the claims be construed as encompassing all of the features of patentable novelty which reside in the present invention, including all features which would be treated as equivalence thereof by those skilled in the art of which the invention pertains.

Experimental Examples

EXAMPLE 1

A silicone adhesive composition is prepared to a 60 wt. % solids in toluene following the following procedure. To a clean reactor 569 g of a MQ resin solution (@ 60% solid in toluene, M to Q ratio about 0.7:1 and a silanol content of approximate 2 wt. % to silicone solid), 259 g of a silanol-stopped dimethylsilicone gum, and 172 g of toluene were charged. The mixture was stirred to homogeneous and catalyzed with sodium hydroxide, then heated to the reflux condition and held for two hours. After the two-hour reflux, the mixture was neutralized with H3PO4 to slightly acidic and adjusted to the 60% solid level with toluene.

EXAMPLE 2

The catalyzed silicone adhesive composition was prepared by adding to 40 g of the mixture from Example 1 a toluene solution containing 0.48 g of benzoyl peroxide. After thorough mixing, the mixture was coated over 1 mil thick polyester film to give a dry adhesive built between 1.5 and 1.9 mil. The adhesive was flashed for 90 seconds in a 95° C. forced air oven, followed by a 90 seconds cure in a 177° C. forced air oven.

Peel adhesion against steel was determined by a Scott Tester at 180 degree pull at a rate of 12 inch/min. according to the ASTM-D3330 method. Probe tack performance was measured by a Polyken Probe Tack Tester (TMI 8-02-1 ) with a probe of 0.5 cm diameter at a contact pressure of 14.5 psi and a probe speed of 1 cm/sec and a dwell time of 1 second. Quick stick property is characterized by a loop tack test against a silicone release coated paper substrate. The reference silicone release coated paper is a standard product No. 8714 of H. P. Smith Division (James River Co.). The loop tack test was done on a loop tack tester of Chemsultants International according to the TLMI Loop Tack Test.

This cured adhesive has the following results: peel adhesion against steel plate of 45 oz/in, probe tack of 726 g/cm$^2$, and loop tack value of 1.8 oz.

EXAMPLES 3

Silicone Composition with Silanol-containing Silicone Fluid

A silanol-containing silicone fluid containing adhesive composition is prepared according to the following procedure. To a clean reactor 569 g of a MQ resin solution (@60% solid in toluene, M to Q ratio about 0.7:1 and a silanol content of approximate 2 wt. % to silicone solid), 259 g of a silanol-stopped dimethylsilicone gum, 42 g of a silanol-containing silicone fluid (a MDT fluid of 90 cps viscosity and ~0.45 wt. % silanol content) and 172 g of toluene were charged. The mixture was stirred to a homogeneous solution and catalyzed with 10% sodium hydroxide solution, then heated to the reflux condition for two hours. After the two-hour reflux, the mixture was neutralized with H$_3$PO$_4$ to slightly acidic. The mixture was further adjusted to a 60 wt. % solid level with toluene.

EXAMPLES 4

Non-Crosslinked Adhesive

A non-curing silicone adhesive is prepared as followed: a 40 g of the reaction product mixture from Example 3 was obtained and coated over a polyester film of 1 mil thick, The adhesive was flashed off the toluene solvent for 90 seconds in a 95° C. forced air oven, followed by a 90 seconds @177° C. exposure in a forced air oven. The dried silicone adhesive has a thickness of 1.5 mil.

The adhesive properties were measured according to the procedure described in Example 2. This "non-crosslinked" adhesive has a loop tack adhesion value of 28.5 oz against the siliconized paper surface, a peel adhesion against steel plate of 40 oz/in, and a probe tack value of 350 g/cm$^2$. The unusually high loop tack value indicates high wettability and adhesion to the silicone release paper surface.

EXAMPLE 5

Cured Adhesive

A curable silicone composition is prepared by dissolving 0.48 g of benzoyl peroxide curing catalyst in 5 g of toluene then discharge it to a 40 g of the mixture from Example 3. Cured pressure sensitive adhesive is prepared by coating the catalyzed mixture over 1 mil polyester film to a dry thickness of 1.5 mil. The adhesive was flashed for 90 seconds @95° C. in a forced air oven then cured for 90 seconds @177° C.

The adhesive properties were characterized according to the procedure described in Example 2. The cured silicone adhesive has a loop tack adhesion value of 13.4 oz against the siliconized paper surface, a peel adhesion of 34 oz/in against steel plate, and a probe tack of 650 g/cm$^2$.

What is claimed:

1. A curable adhesive composition consisting essentially of the reaction mixture of:
    (A) about 45 to about 75 percent of a solid, benzene-soluble, resin copolymer consisting primarily of $R^5_3SiO_{1/2}$ and $SiO_{4/2}$ units and up to 5 molar percent of $R^5_2SiO_{2/2}$ and $R^5SiO_{3/2}$ units, wherein each $R^5$ individually is a hydrocarbon radical containing no more than six carbon atoms, there being from 0.6 to 0.9 inclusive $R^5_3SiO_{1/2}$ units for every $SiO_{4/2}$ units, the resin comprises from about 0.2% to about 5.0% by weight, based on the total solids resin weight, of hydrozy radicals, and (B) about 25 to about 55 percent of a silicone polymer having the formula

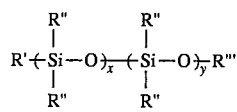

wherein each R" is independently selected from the group consisting of alkyl, alkenyl, phenyl, aryl and arylalkyl, R'" is R", R' is either hydroxy or R", wherein the sum x+y is a number sufficient to give silicone gum having a viscosity from 800,000 cps to 200,000,000 cps and the total solids weight of (A) and (B) being 100 parts, and (C) about 2 to about 30 parts by weight of a silicone fluid, based on the total weight of (A) and (B) being 100 parts, wherein said fluid is capable of reacting with silanol groups, said silicone fluid has the following formula:

(1) $R^1R^2_2Si(OSiR^2_2)_m(OSiR^3R^4)_nOSiR^1_2R^2$ or (2) copolymers comprising $R^1R^2_2SiO_{1/2}$, $R^2_2SiO^2_2$, $R^3R^4SiO_{2/2}$, or $R^1SiO_{3/2}$ units, wherein each $R^2$ independently is an alkyl, aryl, or arylalkyl group having up to 10 carbon atoms; and wherein $R^1$, $R^3$, $R^4$ each having up to 10 carbon atoms and independently selected from alkyl, aryl, arylkyl, alkaryl, hydroxy, hydroxyalkyl, alkoxy, allyl, hydrogen, epoxide-containing aliphatic, epoxide-containing cycloaliphatic, epoxide-containing aromatic, amine, aminocarboxy, fluorinated alkyl, fluorinated alkenyl or fluorinated aryl, and wherein the sum n+m is such that the viscosity of the fluid is up to about 100,000 cps at 25° C. whereby peel adhesion measured by ASTM test D-3330 is improved.

2. A curable adhesive composition as in claim 1, further comprising a cure catalyst.

3. A composition according to claim 1, wherein said silicone fluid has a viscosity from about 35 centipoise to about 500,000 cps at 25° C.

4. A composition according to claim 1, wherein said silicone fluid has a viscosity from about 35 centipoise to bout 100,000 cps at 25° C.

5. A composition according to claim 1, wherein the amount of silicone fluid is from about 2 to about 20% by weight based on the total weight of (A) and (B) silicone solids.

6. A composition according to claim 1, wherein the amount of silicone fluid is from about 3 to about 15% by weight based on the total weight of (A) and (B) silicone fluids.

7. A composition according to claim 5, wherein said silicone fluid is a silanol-containing silicone fluid having a viscosity from about 35 centipoise to about 500,000 centipoise at 25° C.

8. A composition according to claim 1, wherein said silicone gum is a silanol-containing diorganosiloxane gum having a viscosity from about 800,000 to about 200,000,000 cps at 25° C.

9. A composition according to claim 8, wherein said silicone gum is a silanol-containing dimethylsiloxane polymer.

10. A curable adhesive composition as in claim 1, further comprising an organic solvent.

11. A curable adhesive composition as in claim 10 wherein said organic solvent is toluene or xylene.

12. A flexible substrate carrying on at least one surface the curable adhesive of claim 2.

13. A curable adhesive composition as in claim 2, wherein said cure catalyst is benzoyl peroxide.

14. A substrate as in claim 12 wherein said substrate is paper, a polyester polymer, a polyimide polymer, a glass cloth, a polyolefin polymer, or a chemically treated fluorocarbon polymer support.

15. The flexible substrate as in claim 12, further comprising a primer layer, wherein the primer layer is situated on the surface of the surface of the flexible substrate and the curable adhesive is situated on the surface of the primer layer.

* * * * *